March 5, 1968 D. D. STOCKER ET AL 3,372,018
METHOD OF PRODUCING NUTRIENT-CONTAINING PLANT CONTAINERS
Filed Feb. 2, 1966
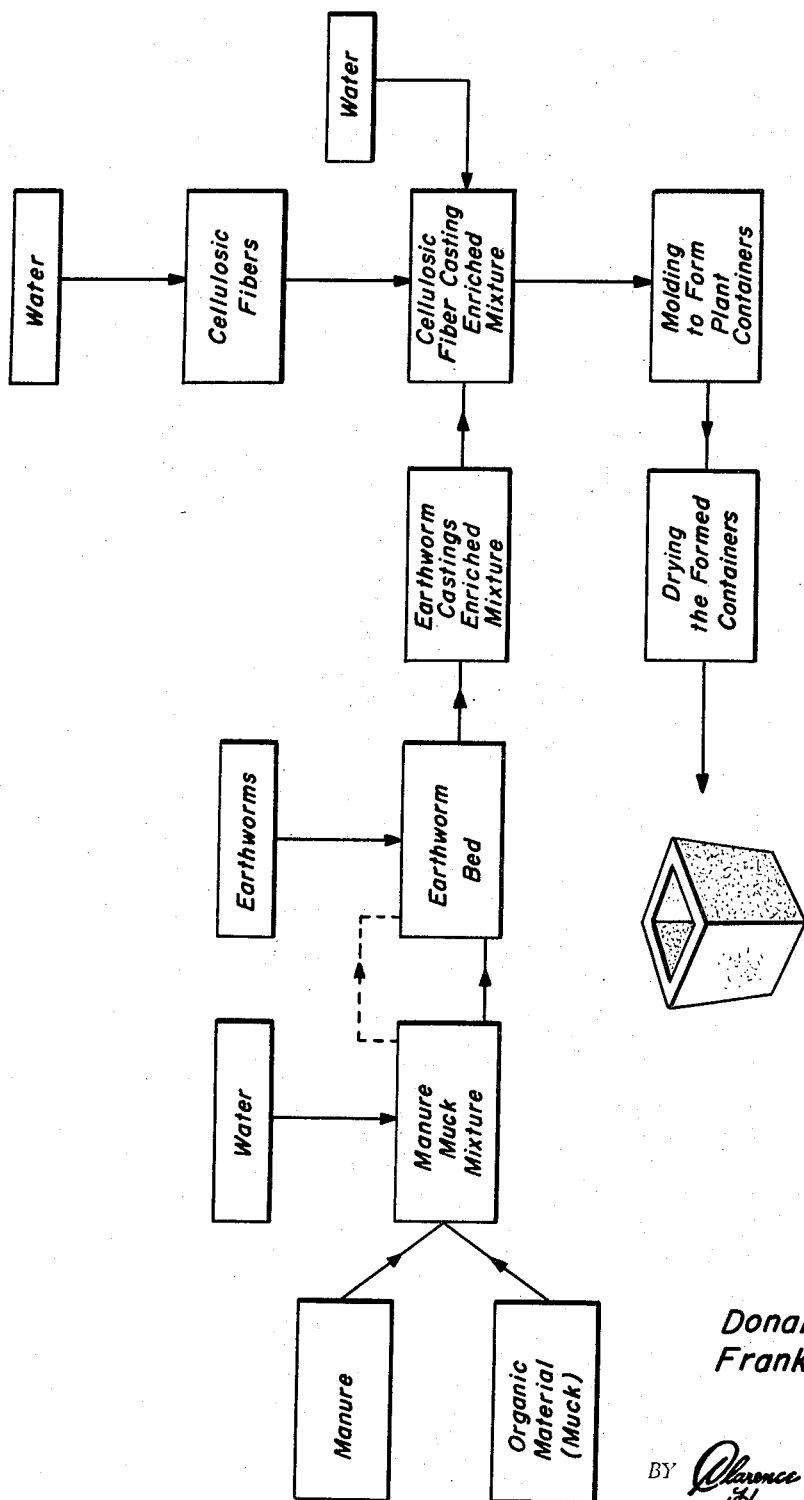
Donald D. Stocker
Frank E. Stocker
INVENTORS.

United States Patent Office 3,372,018
Patented Mar. 5, 1968

3,372,018
METHOD OF PRODUCING NUTRIENT-CONTAINING PLANT CONTAINERS
Donald D. Stocker, Hallandale, Fla. (Box 732, Russell Point, Ohio 43348), and Frank E. Stocker, Lakeview, Ohio (6960 NW. 27th St., Hollywood, Fla. 33024)
Filed Feb. 2, 1966, Ser. No. 524,591
4 Claims. (Cl. 71—21)

The present invention relates generally to plant containers which may be utilized to minimize the shock sustained by plant stock when being transplanted, repotted, etc., more specifically, the present invention relates to a method of producing a formed self-sustaining nutrient-containing plant or seed starting receptacle which when wetted has sufficient strength to maintain its desired configuration and is provided with a sufficient amount of the required plant nutrients to insure the proper growth and tone for the growth of seed, cuttings and plants contained therein.

As is well known, it is imperative that the root stock of a plant being repotted permits adequate room for root growth or being transplanted from a cold frame, hothouse and the like must undergo such movement with a minimum of disturbance to the sensitive, moisture permeable root hairs which normally are present adjacent the terminal ends of the roots. Accordingly, there have been numerous attempts to produce what may be referred to as "plantable" containers in order that the entire container may remain around the root stock when the plant is repotted or transplanted thus assuring that the delicate root hairs will not be adversely affected.

As is well known, in order to accomplish the above, it is necessary that such a "plantable" container be generally self-sustaining when wet for at least a period of time sufficient to permit normal growth of the seed or plant within the container, after which the "plantable" container should distintegrate sufficiently to permit uninhibited growth of the root stock outwardly as the top growth of the plant progresses.

Further, as will be apparent from the foregoing, the "plantable" container should contain substantially all the nutrients required to support the proper growth of a plant within the container up to and at least including such time as the plant becomes crowded within the container and is ready for repotting or transplanting. As is apparent from the above it is imperative that the self-sustaining "plantable" container is of such a nature to permit the root stock of the plant within the container to grow outwardly therethrough so as to permit substantially unhindered growth of the root stock in order to insure maximum growth and tone of the top portion of the plant.

Numerous methods have been proposed heretofore in an attempt to produce containers of the general nature described which are characterized by the parameters discussed above. However, while such attempts have been successful in providing "plantable" containers having sufficient wet strength and permitting generally unhindered growth of the root stock, such methods have not succeeded in producing containers which are characterized by a highly desirable proportion or type of plant nutrient. By proper type of plant nutrient it is meant that nurserymen generally acknowledge the fact that the mere presence of plant nutrients is of no benefit to a plant unless they are in a form which may be readily assimilated.

It is therefore a primary object of the present invention to provide an improved method of forming a self-sustaining nutrient containing plant container which is characterized by a high wet-strength, porosity to permit proper growth of the roots therethrough and an adequate proportion of a highly assimilable natural organic nutrient supply so as to enhance the development of seedlings, cuttings, plants, etc. grown therein.

Another object of the present invention is to provide an improved method of producing a formed self-sustaining nutrient containing plant container which includes a significant proportion of substantially organic material derived from an organic mixture which has been further enriched by virtue of the fact that it has been acted upon by earthworms in a specific manner set forth hereinafter.

A further object of the present invention is to provide an improved method of producing a self-sustaining nutrient-containing "plantable" container which includes a sufficient amount of cellulosic material to ensure that the container will have sufficient wet-strength to permit handling of the container when thoroughly wet, thereby ensuring that the container will not fall apart to expose the delicate root hairs of the plant contained therein during repotting or transplanting of the plant.

Still another object of the present invention is to provide an improved method of producing a self-sustaining nutrient containing "plantable" container which utilizes worm "castings" which are produced in a rather specific method and incorporated in the containers in such a manner so as to ensure availability of the nutrients produced by the worms while substantially precluding the possibility of any viable worms being present in the formed completed containers.

Further objects and aspects of the invention will become apparent from the following discussion when taken together with the drawing which shows a flow diagram of the method of the present invention.

Briefly, the present invention involves a method of producing a formed self-sustaining nutrient containing, "plantable" container by a series of manipulative steps wherein a moist mixture of organic material such as cow manure or other suitable manure such as horse manure for example and black earth containing decaying matter, often referred to as "muck" which are blended and then subjected to the action of earthworms for a predetermined period so as to permit enrichment of the mixture with castings produced by the worms as well as an improvement in the general tilth or particle size of the organic material due to the comminuting action of the worms during their travels therethrough. The worm-casting enriched mixture is then treated in such a manner so as to cause the worms to migrate outwardly therefrom thus permitting collection of a substantially worm-free worm-casting enriched mixture which is then intimately blended with a cellulosic material such as derived from waste newsprint stock and the like so as to materially enhance the wet strength of the "plantable" containers subsequently molded from the cellulosic material worm-casting enriched organic material mixture.

The molding of "plantable" containers from the above described mixture in suitable configurations is carried on in a generally conventional manner after which the molded containers are permitted to air dry for a sufficient length of time so as to ensure that substantially all the worms which may be present therein are no longer viable.

As indicated above the "plantable" containers may be molded in a variety of configurations such as in the form of a solid cube, a flower pot, cylinder, etc. Furthermore, the containers are preferably molded in graduated sizes whereby one size readily telescopes or is insertable within the next larger size so as to permit repotting of a plant when it becomes crowded by inserting it into the next larger size "plantable" pot thereby substantially precluding the danger of plant shock when repotting. The smallest "plantable" container is preferably approximately two inches in diameter or a two inch solid cube, and is primarily intended as a starter pot for an individual seed which may be inserted in a depression in the cube and be raised through the seedling stage within the cube and then repotted into the next size larger plantable container, as required, until such time as it is advisable to transplant to the field. It is contemplated that containers produced in accordance with the method of the present invention may be made up in sizes as large as those having a five gallon volumetric capacity, for example.

The following is a specific example of the manipulative steps comprising the practice of the method of the present invention in producing self-sustaining nutrient containing "plantable" containers characterized by a high wet-strength and highly assimilable form of organic plant nutrient.

A mixture suitable for enrichment by earthworms is produced by intimately blending a mixture of on the basis of volume about 50% well rotted cow manure and 50% decaying mater such as commonly referred to as muck, which components have been moistened with a sufficient amount of water to permit thoroughly blending the same.

The intimately blended mixture of manure and muck is then subjected to the action of earthworms by spreading the mixture in a shallow pit, or enclosure, and introducing approximately 100 to 150 or 200 worms per cubic foot of manure-muck mixture. The mixture is then turned over sufficiently to mix the worms throughout the mixture after which the mixture is leveled off. After the worms have been acting upon the mixture for approximately three days to seven days, a fresh amount of the manure-muck mixture is spread on top of the original mix being acted upon by the worms and the fresh mixture saturated with water. This causes the worms to migrate from the lower bed they have been occupying to the fresh top layer. After approximately twelve hours is allowed for the worms to migrate from the bottom layer to the top layer the top layer is raked aside so as to give access to the bottom layer which is substantially enriched with worm castings. The fresh manure-muck mixture containing the migrated worms is then leveled off and becomes the bottom layer to be acted upon by the worms and is accordingly subsequently utilized as described above.

The worm casting enriched manure-muck mixture produced as set forth above is then admixed on the basis of volume in a 50–50% ratio with about 50% cellulosic material such as obtained from moistening waste newsprint stock and disintegrating the same to produce cellulosic fibers of relatively short staple. The worm casting enriched mixture and the cellulosic material are then intimately blended and introduced into a suitable mold, of a configuration such as previously set forth.

The relatively plastic molded "plantable" containers are then thoroughly dried either by utilizing artificial heat or by permitting the material in the mold to air dry so as to render the molded "plantable" containers self-sustaining and to further ensure that substantially all earthworms which may have inadvertently found their way into the container are no longer viable.

Under normal use, it has been found that a "plantable" container produced as set forth above will not break even when soaking wet. In order to utilize the containers it is merely necessary to place or immerse the dehydrated container in water and permit it to become hydrated, preferably until such time as it has absorbed sufficient water so that it no longer floats, after which the seed, plant cutting, etc. is introduced into the container. The container is then placed in a suitable environment be it a hothouse, cold frame, etc. It will be appreciated that the containers produced in accordance with this invention have a great capacity for retaining water and accordingly the initial soaking tends to keep the container moist for a considerable period of time thus substantially lengthening the interval between watering. Due to the high wet-strength of the "plantable" containers they may also be used above the surface of the ground without fear of their disintegrating materially. However, it will be understood that when they are set in the ground after a prolonged exposure to soil organisms, etc. they will disintegrate sufficiently so as to permit substantially unhindered growth of the root stock of the plant outwardly therefrom.

It has been further discovered that the worm-casting enriched organic mixture provides a highly assimilable nutrient not heretofore incorporated in plantable containers such as those produced in accordance with the method of the present invention.

It may therefore be seen that there has been provided an improved method of producing formed self-sustaining nutrient containing "plantable" containers which are characterized by a high wet-strength.

Since various modifications may be made in the composition of the containers without departing from the spirit of the invention it is contemplated that we be limited only by the scope of the appended claims.

What is claimed as new is as follows:

1. The method of producing a formed self-sustaining nutrient containing plant container characterized by a high wet-strength which comprises:
   (a) moistening a mixture of about 50% by volume of cow manure and 50% by volume of muck with sufficient water to permit thoroughly blending the mixture;
   (b) subjecting the blended mixture to the action of earthworms for a period of about three to seven days to permit enrichment of the mixture with castings produced by the worms;
   (c) covering the worm casting enriched mixture with a layer of a fresh mixture prepared as in (a);
   (d) saturating the top layer of fresh mixture with sufficient water to cause earthworms to migrate from worm casting rich lower layer to the top layer of fresh mixture, and removing the worm laden fresh top layer to expose the worm casting enriched lower layer;
   (e) admixing on the basis of volume about 50% of the worm casting enriched mixture with 50% cellulosic material such as obtained from disintegrated moist newsprint stock and plasticizing the mixture with sufficient water to permit molding the mixture;
   (f) molding the plasticized worm casting-cellulosic fiber mixture into plant receiving containers;
   (g) thoroughly drying the moist plant receiving containers to render them self-sustaining and inactivate substantially all viable earthworms which may be present in the formed containers.

2. The method of claim 1 wherein step (b) is carried forth by utilizing about 100 to 200 earthworms per cubic foot of blended mixture.

3. The method of claim 1 wherein in step (d) the water saturated top layer remains in contact with the worm-casting laden mixture for at least 12 hours before being removed to expose the lower layer.

4. The plant container produced by the method of claim 1.

References Cited

Fuller, L.: Earthworm Gardening in the Desert, in Org. Gard. and Farm., 7 March 1960, pp. 53–55, SB 1071.

S. LEON BASHORE, *Primary Examiner.*

R. BAJEFSKY, *Assistant Examiner.*